US012738594B2

(12) United States Patent
James

(10) Patent No.: US 12,738,594 B2
(45) Date of Patent: Sep. 15, 2026

(54) THERMAL RUNAWAY DEBRIS CAPTURE DEVICES AND METHODS

(71) Applicant: Electric Power Systems, Inc., North Logan, UT (US)

(72) Inventor: Joseph James, Hyde Park, UT (US)

(73) Assignee: ELECTRIC POWER SYSTEMS, INC., North Logan, UT (US)

( * ) Notice: Subject to any disclaimer, the term of this patent is extended or adjusted under 35 U.S.C. 154(b) by 0 days.

(21) Appl. No.: 18/868,094

(22) PCT Filed: May 23, 2023

(86) PCT No.: PCT/US2023/023254
§ 371 (c)(1),
(2) Date: Nov. 21, 2024

(87) PCT Pub. No.: WO2023/230076
PCT Pub. Date: Nov. 30, 2023

(65) Prior Publication Data

US 2025/0192354 A1 Jun. 12, 2025

Related U.S. Application Data

(60) Provisional application No. 63/344,696, filed on May 23, 2022.

(51) Int. Cl.
*H01M 50/358* (2021.01)
*H01M 50/224* (2021.01)
*H01M 50/233* (2021.01)

(52) U.S. Cl.
CPC ....... *H01M 50/358* (2021.01); *H01M 50/224* (2021.01); *H01M 50/233* (2021.01)

(58) Field of Classification Search
CPC ............. H01M 50/358; H01M 50/224; H01M 50/233; H01M 2220/20; Y02E 60/10
See application file for complete search history.

(56) References Cited

U.S. PATENT DOCUMENTS

2019/0157636 A1* 5/2019 Miler .................... H01M 50/30
2021/0066690 A1 3/2021 Gondoh
(Continued)

FOREIGN PATENT DOCUMENTS

DE 102015005592 11/2016
DE 102020201410 8/2021
(Continued)

OTHER PUBLICATIONS

ISA, International Search Report and Written Opinion dated Oct. 16, 2023 in International No. PCT/US2023/023254.
(Continued)

*Primary Examiner* — Kiran Quraishi Akhtar
(74) *Attorney, Agent, or Firm* — SNELL & WILMER L.L.P.

(57) ABSTRACT

A debris capture device for use in a battery system includes a housing and a baffle arrangement. The baffle arrangement is sized and configured to capture debris that is greater than a threshold weight (e.g., 10 grams) and/or greater than a threshold size (e.g.; 0.25 inches (0.635 cm)) to prevent the debris from being exhausted out an exhaust system of the battery system. The present disclosure relates generally to thermal runaway debris capture systems, devices, and methods, and more specifically, to thermal runway capture devices for use in aviation systems.

7 Claims, 8 Drawing Sheets

(56) References Cited

U.S. PATENT DOCUMENTS

| | | | | |
|---|---|---|---|---|
| 2022/0085459 | A1 | 3/2022 | Demont et al. | |
| 2022/0407177 | A1* | 12/2022 | Zhang | H01M 50/358 |

FOREIGN PATENT DOCUMENTS

| | | | | |
|---|---|---|---|---|
| KR | 20220027863 | | 3/2022 | |
| WO | WO 2022/041062 | * | 3/2022 | H01M 50/342 |
| WO | 2023230076 | | 11/2023 | |

OTHER PUBLICATIONS

International Bureau, International Preliminary Report on Patentability dated Nov. 7, 2024 in PCT/US2023/023254.

EPO, Search Report and Written Opinion dated Apr. 16, 2026 in Application No. 23812466.3.

* cited by examiner

THERMAL RUNAWAY DEBRIS CAPTURE DEVICES AND METHODS

CROSS REFERENCE TO RELATED APPLICATIONS

This application is a U.S. national stage entry under 35 U.S.C. § 371 of International Application No. PCT/US2023/023254 filed May 23, 2023 entitled "THERMAL RUNAWAY DEBRIS CAPTURE DEVICES AND METHODS." The '254 PCT claims priority to, and the benefit of, U.S. Provisional Application No. 63/344,696 filed May 23, 2022, entitled "THERMAL RUNAWAY DEBRIS CAPTURE DEVICES AND METHODS." Each of the foregoing applications are hereby incorporated by reference in their entirety for all purposes.

FIELD

The present disclosure relates generally to thermal runaway debris capture systems, devices, and methods, and more specifically, to thermal runway capture devices for use in aviation systems.

BACKGROUND

A battery cell that experiences a thermal runaway event can produce ejecta that originates from internal components of a battery cell (e.g., a lithium-ion battery cell). Additionally, debris can be generated in a battery pack from damaged module internal components. Ejecta gas can be expelled from the vehicle. However, ejecta gas can carry ejecta/debris (e.g., in a solid form), which can pose a safety hazard if aviation ejecta/debris exit the vehicle with the gas.

SUMMARY

A debris capture device for use in a battery system is disclosed herein. The debris capture device includes a housing and a baffle arrangement. The baffle arrangement is sized and configured to capture debris that is greater than a threshold weight (e.g., 10 grams) and/or greater than a threshold size (e.g., 0.25 inches (0.635 cm)) to prevent the debris from being exhausted out an exhaust system of the battery system.

The debris capture device disclosed herein can be configured to capture debris from ejecta that is produced in response to a cell in the battery system entering thermal runaway.

In various embodiments, the housing includes an inlet, an outlet, and a cavity disposed therein; and the baffle arrangement is disposed within the cavity of the housing, wherein in response to a cell in the battery system entering thermal runaway, the housing is configured to receive an ejecta from the cell and the baffle arrangement is configured to collect a debris that has a weight that is greater than 10 grams and eject a gas from the ejecta through the outlet.

In various embodiments, the outlet has a lesser cross-sectional area relative to the inlet. In various embodiments, the housing comprises a metal having a melting temperature that is greater than 1,200° C. (2,192° F.).

In various embodiments, the housing is configured to be leak-proof during a thermal runaway event from the cell in the battery system entering thermal runaway.

In various embodiments, the inlet includes a first center point that is a first vertical height from a bottom side of the housing, the outlet includes a center point that is a second vertical height from the bottom side of the housing, and the second vertical height is greater than the first vertical height.

In various embodiments, in response to the gas carrying the debris into the cavity, the debris is collected in the housing in response to being perturbed by the baffle arrangement.

In various embodiments, the housing is configured to receive the gas carrying the debris through the inlet, retain the debris in the cavity, and expel the gas through the outlet.

In various embodiments, an exhaust system of the battery system includes the debris capture device, a common inlet conduit coupled to the housing, the common inlet conduit in fluid communication with the inlet of the housing, and a plurality of module conduits coupled to, and in fluid communication with, the common inlet conduit.

In various embodiments a battery system comprises the debris capture device, a plurality of battery modules, and a common inlet conduit, wherein in response to the cell in a first battery module in the plurality of battery modules entering thermal runaway, exhaust gases and the debris are configured to be exhausted from the first battery module through the common inlet conduit to the debris capture device.

In various embodiments, each battery in the plurality of battery modules includes a vent port, wherein the vent port of a respective battery module is in fluid communication with the outlet of the debris capture device in response to the cell in the respective battery module of the battery system entering thermal runaway.

In various embodiments, an electrically powered aircraft comprises an exhaust system with the debris capture device, an electric motor, and a plurality of battery modules electrically coupled to the electric motor, wherein in response to the cell in a first battery module in the plurality of battery modules entering thermal runaway, exhaust gases and the debris are configured to be exhausted from the first battery module to the debris capture device.

In various embodiments, the plurality of battery modules are configured to power the electric motor during operation of the electrically powered aircraft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a debris capture device for use in a thermal runaway exhaust system of a battery system. The debris capture device is configured to collect a debris from an ejecta that has a weight that is greater than 10 grams (or that has a size greater than 0.25 inches (0.635 cm) in any linear dimension) and eject a gas from the ejecta in response to receiving the ejecta with the gas and the debris. The debris capture device can further be configured to be leak-proof during a thermal runaway event. "Leak-proof" as referred to herein, is a structure that is constructed to prevent leakage entirely (i.e., to prevent leakage of a gas, such as a gas from ejecta). In this regard, the debris capture device can be configured for thermal runaway containment, control, and exhaust, in accordance with various embodiments.

Figure 1:
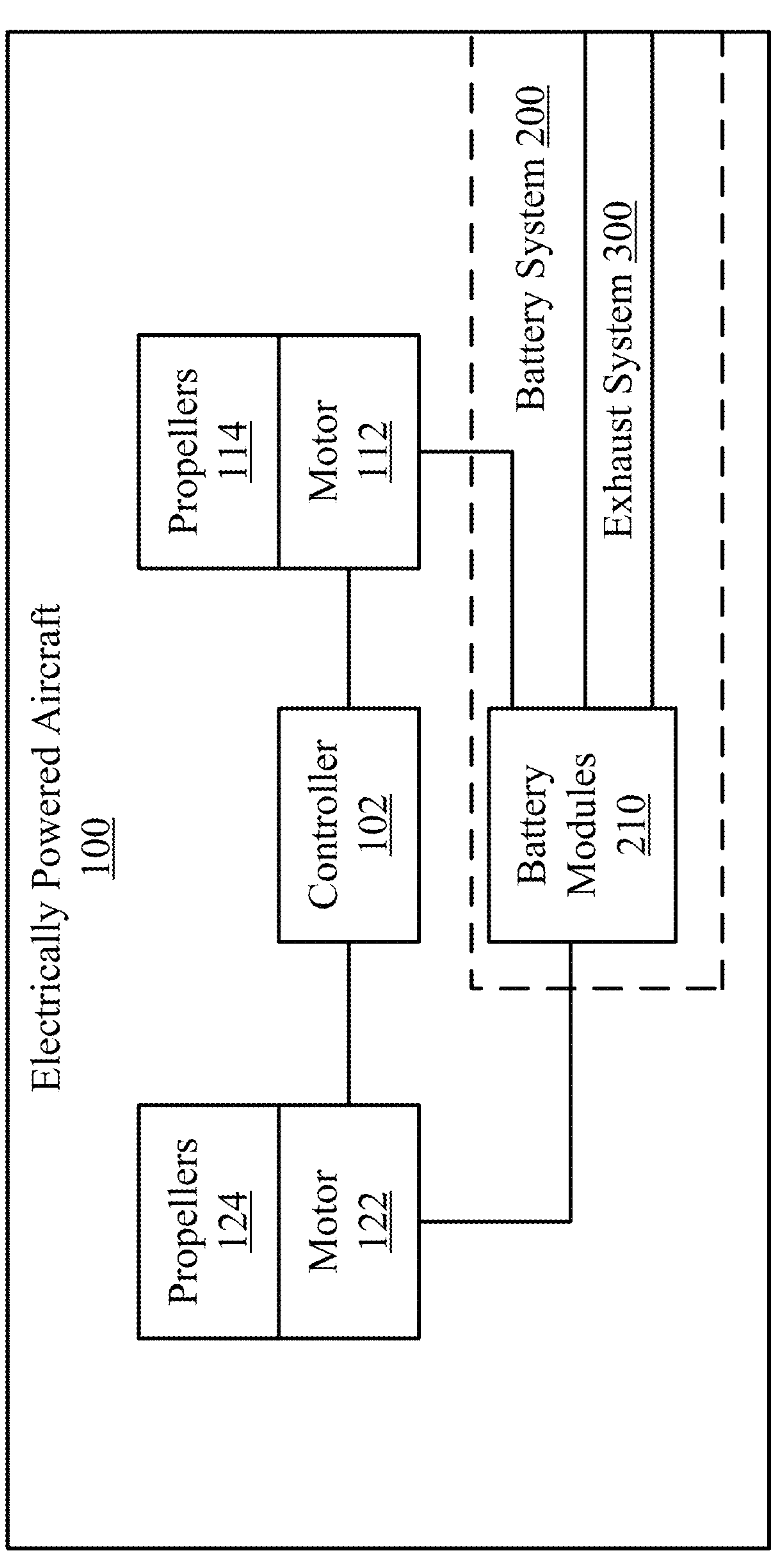
FIG. 1 illustrates an electrically powered aircraft having a debris captured device, in accordance with various embodiments.

Referring to FIG. 1, a schematic view of an electrically powered aircraft 100 having a battery system 200 is illustrated, in accordance with various embodiments. The battery system 200 comprises a plurality of battery modules 210 and an exhaust system 300.

The electrically powered aircraft 100 can comprise a controller 102, motors 112, 122, and propellers 114, 124 (or any other electrically powered propulsion unit). Each motor 112, 122 is operably coupled to a respective propeller 114, 124, and each motor 112, 122 is electrically coupled to the battery system 200. Although illustrated as motors 112, 122 being coupled to a single battery system (i.e., battery system 200), the present disclosure is not limited in this regard. For example, each motor 112, 122 can be electrically coupled to a distinct and/or independent battery system (e.g., a first battery system for motor 112 and a second battery system for motor 122), and still be within the scope of this disclosure.

The battery system 200 is configured to power at least one of the motors 112, 122 to drive a respective propeller (e.g., propeller 114 and/or propeller 124) and power the electrically powered aircraft 100, in accordance with various embodiments. In various embodiments, the controller 102 is configured to command the motors 112, 122 to pull power from the battery system 200 during operation of the electrically powered aircraft 100. Although discussed further herein as being configured for an aircraft (e.g., electrically powered aircraft 100), the present disclosure is not limited in this regard. For example, the battery system 200 could be used in other electric vehicles, such as electric cars, electric trucks, electric boats, or the like.

In various embodiments, the controller 102 is in operable communication (e.g., wireless or wired) with motors 112, 122. In various embodiments, controller 102 may be configured as a central network element or hub to access various systems and components of the electrically powered aircraft 100. Controller 102 may comprise a network, computer-based system, and/or software components configured to provide an access point to various systems and components of the electrically powered aircraft 100. In various embodiments, controller 102 may comprise a processor. In various embodiments, controller 102 may be implemented in a single processor. In various embodiments, controller 102 may be implemented as and may include one or more processors and/or one or more tangible, non-transitory memories and be capable of implementing logic. Each processor can be a general-purpose processor, a digital signal processor ("DSP"), an application specific integrated circuit ("ASIC"), a field programable gate array ("FPGA") or other programable logic device, discrete gate or transistor logic, discrete hardware components, or any combination thereof. Controller 102 may comprise a processor configured to implement various logical operations in response to execution of instructions, for example, instructions stored on a non-transitory, tangible, computer-readable medium configured to communicate with controller 102. In various embodiments, the controller 102 can include, or be a component of, a battery power management unit, a battery management system, or the like. The present disclosure is not limited in this regard.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the battery system 200 may be configured for use on an aircraft (e.g., electrically powered aircraft 100). A battery system 200 includes a plurality of electrically connected battery modules 210. A battery module in the plurality of battery modules 210, for purposes of this disclosure, includes a plurality of electrically connected cells (e.g., cell-brick assemblies, pouch cells, or the like) disposed within a housing, as described further herein. These electrically connected cells may, in turn, include a parallel, series, or combination of both, collection of electrochemical or electrostatic cells, hereafter referred to collectively as "cells," that can be charged electrically to provide a static potential for power or released electrical charge when needed. When cells are assembled into a battery module in the plurality of battery modules 210, the cells are often linked together through metal strips, straps, wires, bus bars, etc., that are welded, soldered, or otherwise fastened to each cell to link them together in the desired configuration. A cell may comprise of at least one positive electrode and at least one negative electrode. One common form of such a cell is the well-known secondary cells packaged in a cylindrical metal can or in a prismatic case. Examples of chemistry used in such secondary cells are lithium cobalt oxide, lithium manganese, lithium iron phosphate, nickel cadmium, nickel zinc, and nickel metal hydride. Such cells are mass produced, driven by an ever-increasing consumer market that demands low-cost rechargeable energy for portable electronics.

In various embodiments, the plurality of battery modules 210 are fluidly coupled to the exhaust system 300. The exhaust system 300 is configured to exhaust hot gases and debris, during a thermal runaway of a cell in a battery module in the plurality of battery modules 210 as described further herein.

Figure 2A:
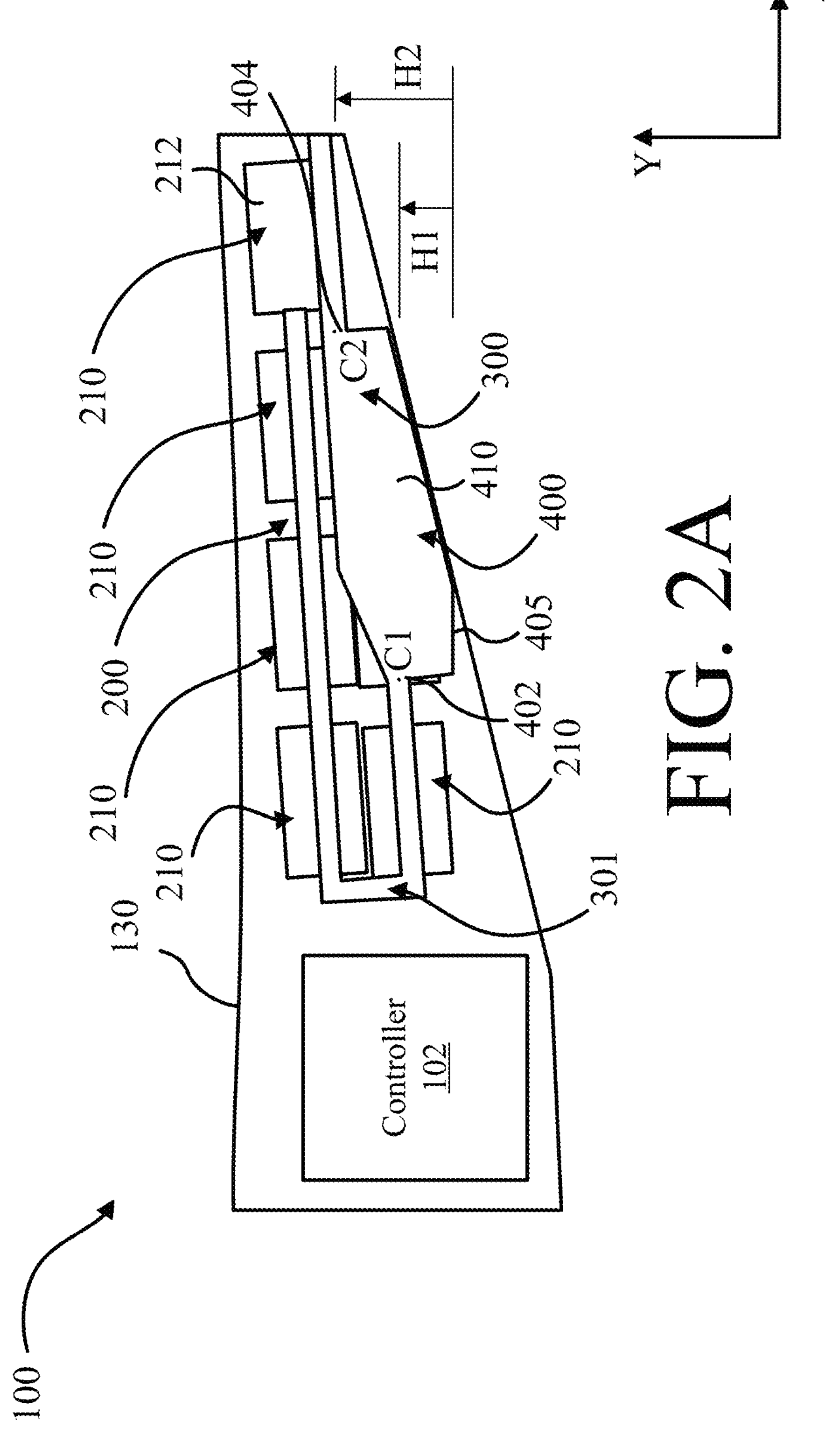
FIG. 2A illustrates a side view of a portion of an electrically powered aircraft with a debris capture device, in accordance with various embodiments.

Referring now to FIG. 2A, a side view of a portion of the electrically powered aircraft 100 from FIG. 1 is illustrated, in accordance with various embodiments. The electrically powered aircraft 100 includes an aircraft body 130 (e.g., a wing, a fuselage, etc.), the battery system 200, and the exhaust system 300. In various embodiments, the battery system 200 and the exhaust system 300 are disposed within the aircraft body 130. Although illustrated, and described herein, as being entirely within the aircraft body 130, the present disclosure is not limited in this regard. For example, a portion of the battery system 200 or the exhaust system 300 can be disposed outside of the aircraft body 130 and still be within the scope of this disclosure.

In various embodiments, the battery system 200 of the electrically powered aircraft 100 comprises a plurality of battery modules 210. Each battery module in the plurality of battery modules 210 is interconnected to form the battery system 200. Stated another way, the plurality of battery modules 210 are coupled together (i.e., in series and/or in parallel) to form the battery system 200.

In an example embodiment, a battery module in the plurality of battery modules 210 may comprise a nominal voltage of approximately 7 volts, a capacity of approximately 50 ampere-hours, an energy output of approximately 0.36 kWh, or the like. Although an example battery module may have these specifications, any battery module of any specification is within the scope of this disclosure. For example, a battery module as disclosed herein may comprise a nominal voltage of approximately 39 volts, a capacity of approximately 60 ampere-hours, an energy output of approximately 2.3 kWh, or the like. In an example embodiment, a 1,000-volt battery system may be created by interconnecting one-hundred and thirty-six battery modules in series as disclosed herein. In various embodiments, by having each battery module isolated and discrete from the remaining battery modules, a thermal runaway event may be limited to a single battery module in the plurality of battery modules 210 where the thermal runaway event occurs. In this regard, in accordance with various embodiments, a battery module, as disclosed herein, may be configured to contain a thermal runaway event of a cell disposed in the battery module without affecting any cell in any of the remaining battery modules from the plurality of battery modules 210.

In various embodiments, the plurality of battery modules 210 are electrically coupled to an electric motor (e.g., motor 112 and/or motor 122 from FIG. 1). In this regard, the plurality of battery modules 210 are configured to power the electric motor (e.g., motor 112 and/or motor 122 from FIG. 1). The exhaust system 300 comprises a debris capture device 400, and the exhaust system 300 is operably coupled to the plurality of battery modules 210. For example, in response to a cell in a battery module (e.g., battery module 212) in the plurality of battery modules 210 entering thermal runaway, the debris capture device 400 of the exhaust system 300 is configured to receive ejecta (e.g., through a plumbing system 301 of the exhaust system 300) from the battery module (e.g., battery module 212) and collect debris that has a weight that is greater than 10 grams from the ejecta and exhaust a gas of the ejecta, as described further herein, in accordance with various embodiments. Although described herein as being configured to capture debris that is greater than 10 grams, the present disclosure is not limited in this regard. For example, the debris capture device 400 could be configured to capture any debris that is greater than 5 grams, or greater than 3 grams, and still be within the scope of this disclosure. However, the value of capturing debris at lesser weights than 10 grams can be negligible. In particular, a weight and cost associated with accomplishing capturing the lesser weights may outweigh any additional benefit. Similarly, although described herein as being configured to capture debris of a certain weight, the debris capture device 400 can be configured to capture debris of a certain size as well. For example, in accordance with various embodiments, the debris capture device 400 is configured to capture, collect, secure, or the like any debris that is greater than 0.25 inches (0.635 cm) in size (meaning having no linear dimension or cross section greater than 0.25 inches), in accordance with various embodiments. Moreover, the present disclosure is not limited in this regard, either. For example, the debris capture device 400 could be configured to capture debris greater than any suitable dimension, to the extent practicable, in accordance with various embodiments.

Figure 2B:
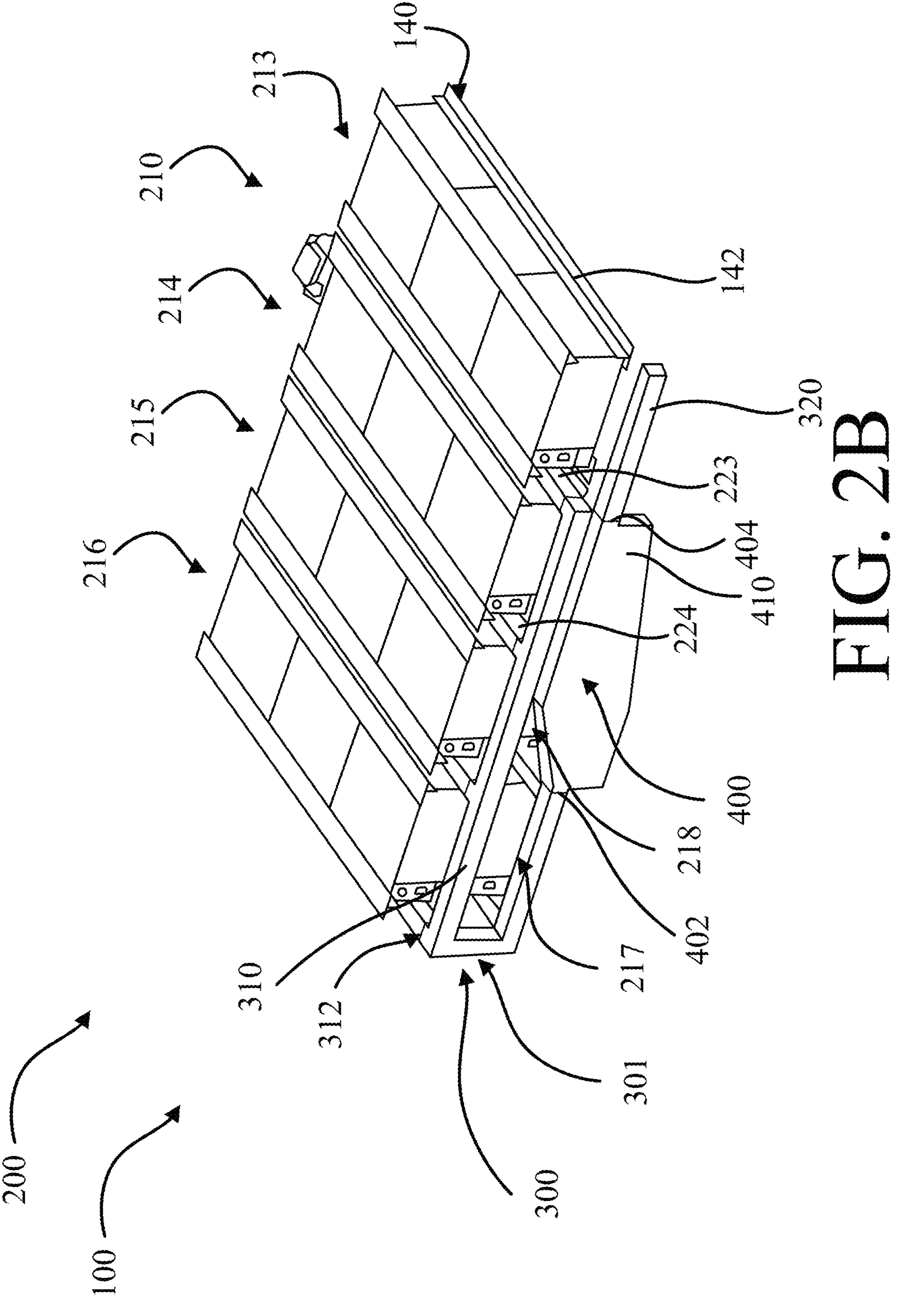
FIG. 2B illustrates a perspective view of a battery system with a debris capture device, in accordance with various embodiments.

Referring now to FIG. 2B, a perspective view of the battery system 200 of the electrically powered aircraft 100 from FIGS. 1 and 2A is illustrated, in accordance with various embodiments. In various embodiments, the battery system 200 further comprises the plumbing system 301 and the plurality of battery modules 210 of the battery system 200 can further comprise arrays of battery modules (e.g., array of battery modules 213, 214, 215, 216, 217, 218). Although illustrated as including six arrays of battery modules, the present disclosure is not limited in this regard. For example, any number of arrays of battery modules to achieve a desired voltage, capacity, and/or energy output for the battery system 200 is within the scope of this disclosure. Although described further herein with respect to only two arrays of the plurality of battery modules 210, in the interest of brevity, the present disclosure is not limited in this regard. For example, any number of the array of battery modules in the plurality of battery modules 210 connected to the corresponding exhaust system 300 can be within the scope of the description of the array of battery modules 213, 214 as described further herein.

In various embodiments, the plurality of battery modules include the first array of battery modules 213 and the second array of battery modules 214. The first array of battery modules 213 includes a first common exhaust conduit 223.

Similarly, the second array of battery modules 214 includes a second common exhaust conduit 224. The first common exhaust conduit 223 and the second common exhaust conduit 224 are in fluid communication with the debris capture device 400 (e.g., through the plumbing system 301 of the exhaust system 300). In various embodiments, each array of battery modules is spaced apart (e.g., in a chordwise direction of a wing, or an aft or forward direction of a fuselage) from an adjacent array of battery modules. For example, the first array of battery modules 213 is spaced apart from the second array of battery modules 214 in a chordwise or forward direction, in accordance with various embodiments.

In various embodiments, the plumbing system 301 includes a common inlet conduit 310, a common outlet conduit 320, and the debris capture device 400. In various embodiments, the common inlet conduit 310 includes a plurality of inlet ports 312. Each inlet port in the plurality of inlet ports 312 corresponds to a respective array of battery modules (e.g., array of battery module 213, 214, 215, 216, 217, 218) in the plurality of battery modules 210.

Figure 2C:
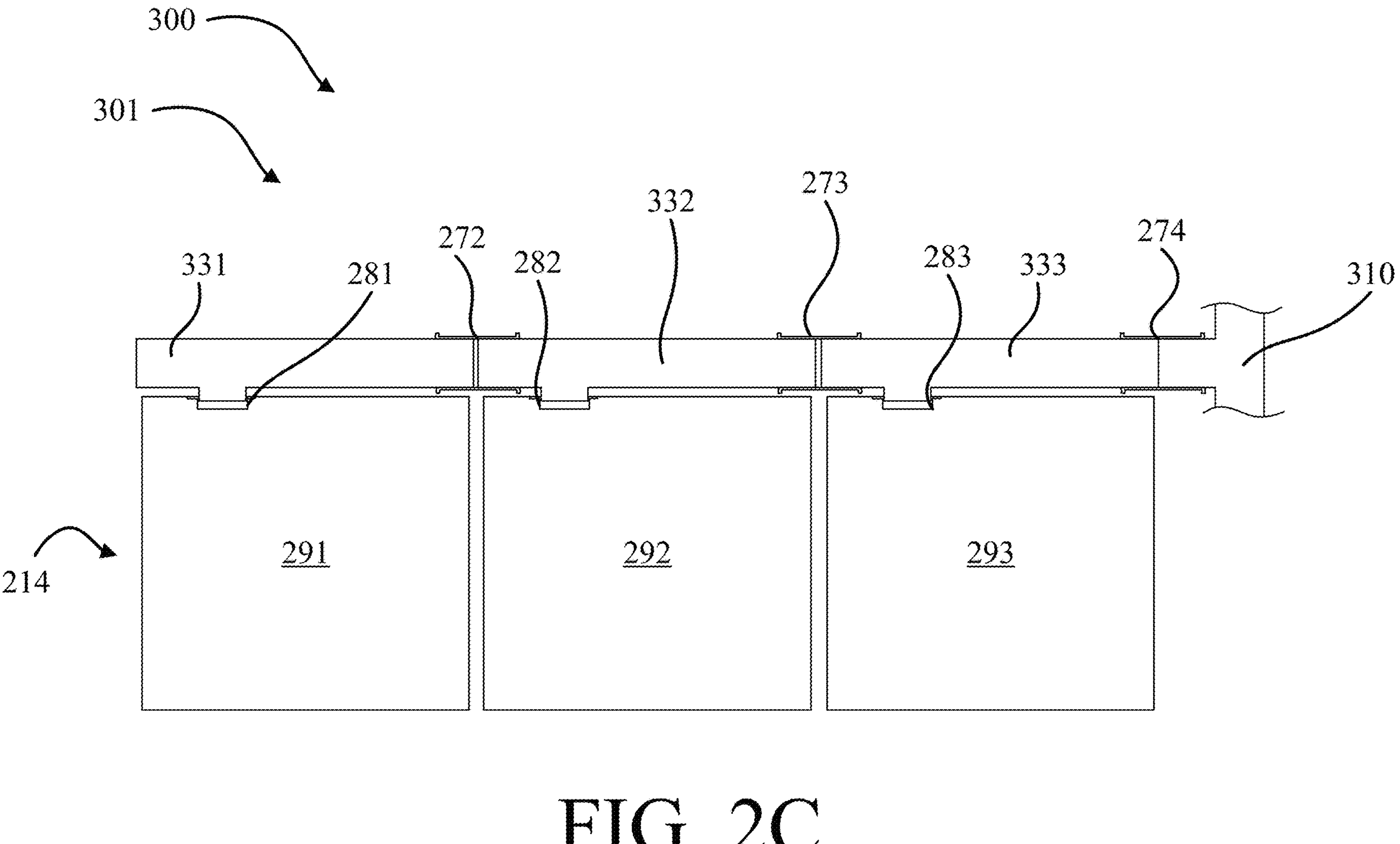
FIG. 2C illustrates a side view of a portion of an exhaust system, in accordance with various embodiments.

Referring now to FIG. 2C, each battery module in an array of battery modules (e.g., array of battery modules 214) can comprise a vent port (e.g., vent port 281 for battery module 291, vent port 282 for battery module 292, and vent port 283 for battery module 293. In various embodiments, the vent port (e.g., vent ports 281, 282, 283) of a respective battery module (e.g., battery modules 291, 292, or 293) in an array of battery modules (e.g., array of battery modules 214) can be configured to be in fluid communication with the outlet 404 of the debris capture device 400) from FIG. 2B in response to a cell in the respective battery module entering thermal runaway. Stated another way, the vent port (e.g., vent port 281) of a respective battery module (e.g., battery module 291), where a cell in the battery module enters thermal runaway, can be configured to open in response to the cell entering thermal runaway (e.g., via a valve, a burst disc, or the like). However, the present disclosure is not limited in this regard. For example, the vent port (e.g., vent ports 281, 282, 283) of each battery module (e.g., battery modules 291, 292, 293) in an array of battery modules (e.g., array of battery modules 214) can be configured to be sealed during normal operation and only open in response to a thermal runaway event by a cell in a respective battery module.

In various embodiments, the plumbing system 301 of the exhaust system 300 further comprises an exhaust tube for each battery module. For example, each battery module (e.g., battery modules 291, 292, or 293) in an array of battery modules (e.g., array of battery modules 214) can have a respective exhaust tube (e.g., exhaust tube 331 for battery module 291, exhaust tube 332 for battery module 292, and exhaust tube 333 for battery module 293). The exhaust tubes can be coupled together by a coupler (e.g., couplers 272, 273). In various embodiments, a coupler can couple a final exhaust tube in a respective array of battery modules to the common inlet conduit 310 of the plumbing system 301. For example, coupler 274 can couple a final exhaust tube (e.g., exhaust tube 333) in the array of battery modules 214 to the common inlet conduit 310 of the plumbing system 301. Although illustrated as having an exhaust tube for each battery module, the present disclosure is not limited in this regard. For example, a single exhaust tube can be utilized instead of distinct exhaust tubes 331, 332, 333, and still be within the scope of this disclosure. In various embodiments, the exhaust tubes 331, 332, 333 for the array of battery modules 214 form the common exhaust conduit 224. In various embodiments, the common exhaust conduit for each array of battery modules can be in accordance with the common exhaust conduit 224 from FIG. 2B.

Referring back to FIG. 2B, the debris capture device 400 comprises a housing 410 (the housing 410 including an inlet 402 and an outlet 404) and the baffle arrangement (e.g., single baffle configuration 401 from FIG. 4, multi baffle configuration 501 from FIG. 5, centrifugal baffle configuration 601 from FIG. 6, etc.) disposed therebetween, as described further herein. The inlet 402 is in fluid communication with the common inlet conduit 310 of the plumbing system 301. Similarly, the outlet 404 is in fluid communication with the common outlet conduit 320 of the plumbing system 301. For example, the common inlet conduit 310 can be coupled to the housing 410 to fluidly couple the inlet 402 of the housing 410 to the common inlet conduit 310, and the common outlet conduit 320 can be coupled to the housing 410 to fluidly couple the outlet 404 of the housing 410 to the common outlet conduit 320 in accordance with various embodiments. "Coupled" as referred to herein includes being integral with (i.e., formed from a single piece of material), joined or bonded components (e.g., via welding, brazing, etc.), or removeable couplings (e.g., fittings, adapters or the like coupled via fasteners or any other fastening device. The present disclosure is not limited in this regard.

With brief reference back to FIG. 2A, the inlet 402 of the housing 410 of the debris capture device 400 includes a first center point C1 that is a first vertical height H1 (i.e., in the Y-direction) from a bottom side 405 of the housing 410. The outlet 404 includes a second center point C2 that is a second vertical height H2 from the bottom side 405 of the housing 410. The second height H2 is greater than the first vertical height H1. As described further herein, the inlet 402 of housing 410 of the debris capture device 400 is configured to receive an ejecta from a cell of a battery module in the plurality of battery modules 210 in response to the cell entering thermal runaway. The ejecta includes a gas emitted from the cell and pieces of debris that are generated in response to the cell entering thermal runaway (e.g., physical elements from the cell, other cells, and/or adjacent components in the battery module that the cell entering thermal runaway is disposed within). In response to receiving the ejecta through the inlet 402 of the housing 410, the baffle arrangement (e.g., single baffle configuration 401 from FIG. 4, multi baffle configuration 501 from FIG. 5, centrifugal baffle configuration 601 from FIG. 6, etc.) of the debris capture device 400 is configured to capture, collect, secure any debris in the pieces of debris that are greater than a threshold weight (e.g., weigh more than 10 grams) and/or that are greater than a threshold size (i.e., has a size that is greater than 0.25 inches (0.635 cm) in any linear direction, such as within a spherical envelope having a diameter of 0.25 inches (0.635 cm)), as described further herein. In response to the ejecta traveling into the debris capture device 400 (i.e., in response to a gas of the ejecta carrying debris into a cavity of the debris capture device 400), some of the debris (e.g., a large debris) in the pieces of the debris from the thermal runaway event are captured in the debris capture device 400 (e.g., in response to being perturbed by the baffle arrangement (e.g., single baffle configuration 401 from FIG. 4, multi baffle configuration 501 from FIG. 5, centrifugal baffle configuration 601 from FIG. 6, etc.) of the debris capture device 400, and a remainder of the debris (i.e., debris below the threshold weight or size), and the gas from the ejecta are exhausted out the outlet 404 of the housing 410. Stated another way, gas that is traveling through the housing 410 of the debris capture device 400 can rise in the housing and exit the outlet 404 of the housing 410 and carry any pieces of debris that are below the threshold weight and/or size, in accordance with various embodiments.

Figure 4:
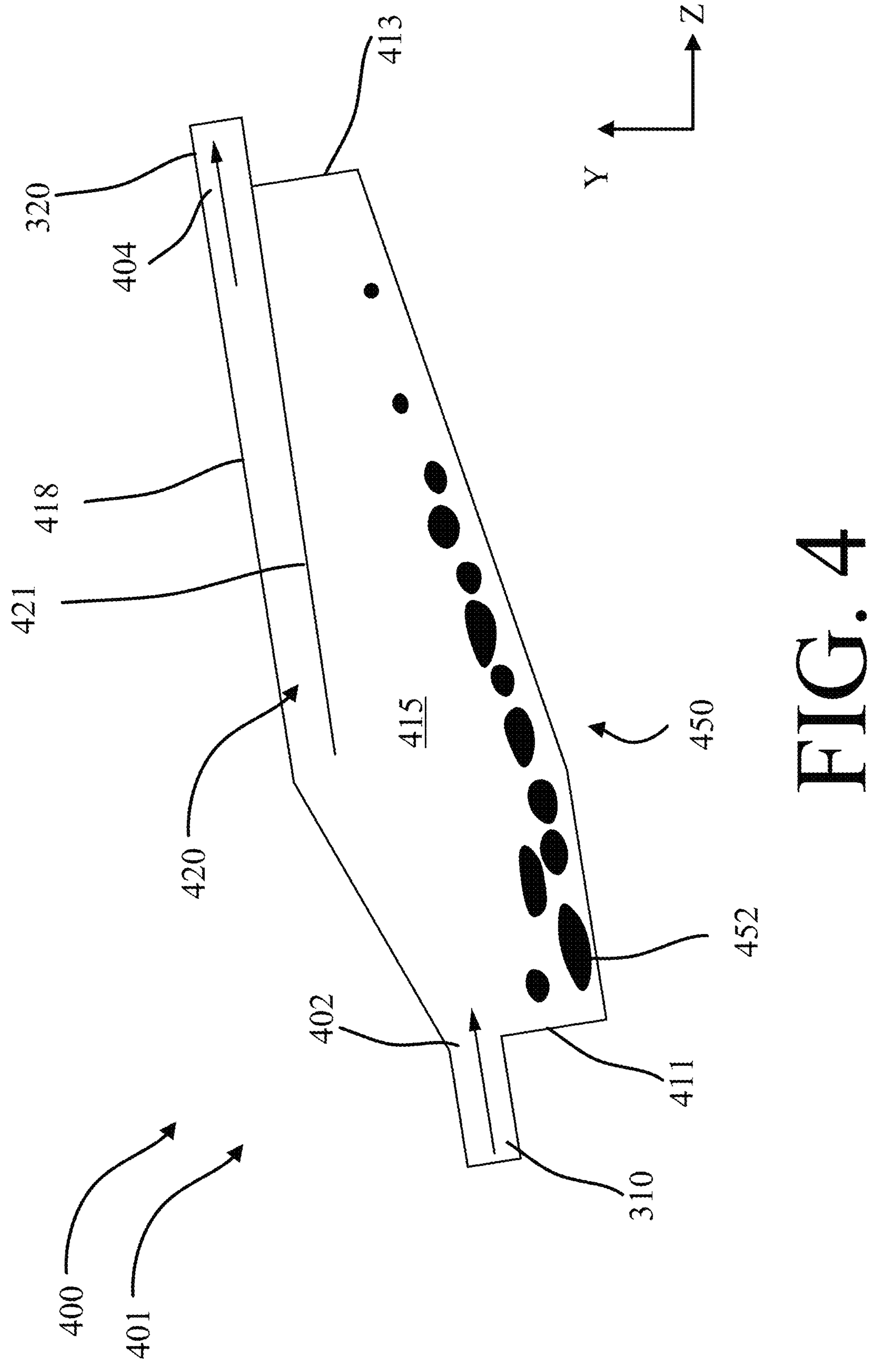
FIG. 4 illustrates a debris capture device for use in an exhaust system of a battery device, in accordance with various embodiments.
Figure 5:
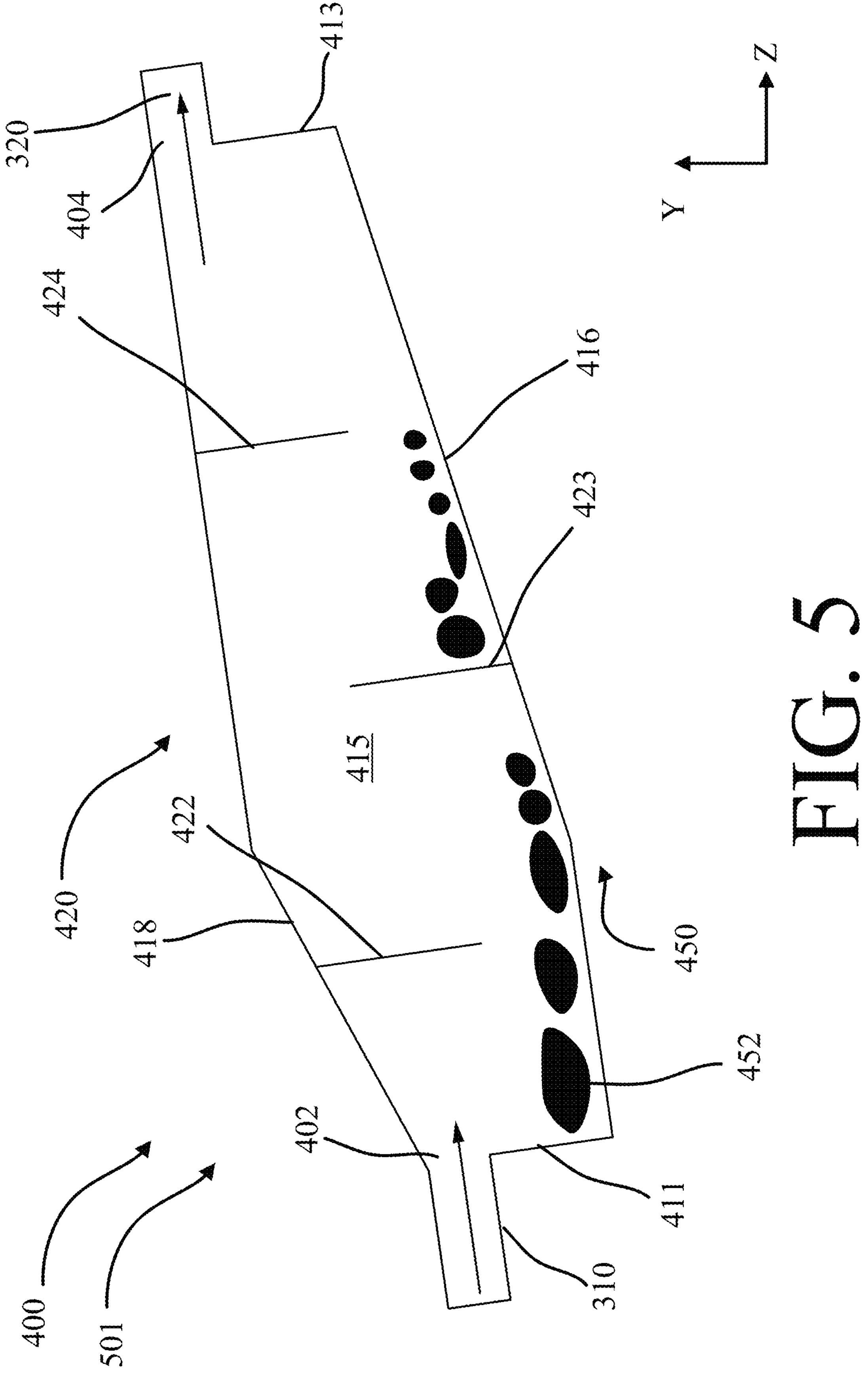
FIG. 5 illustrates a debris capture device for use in an exhaust system of a battery device, in accordance with various embodiments.
Figure 6:
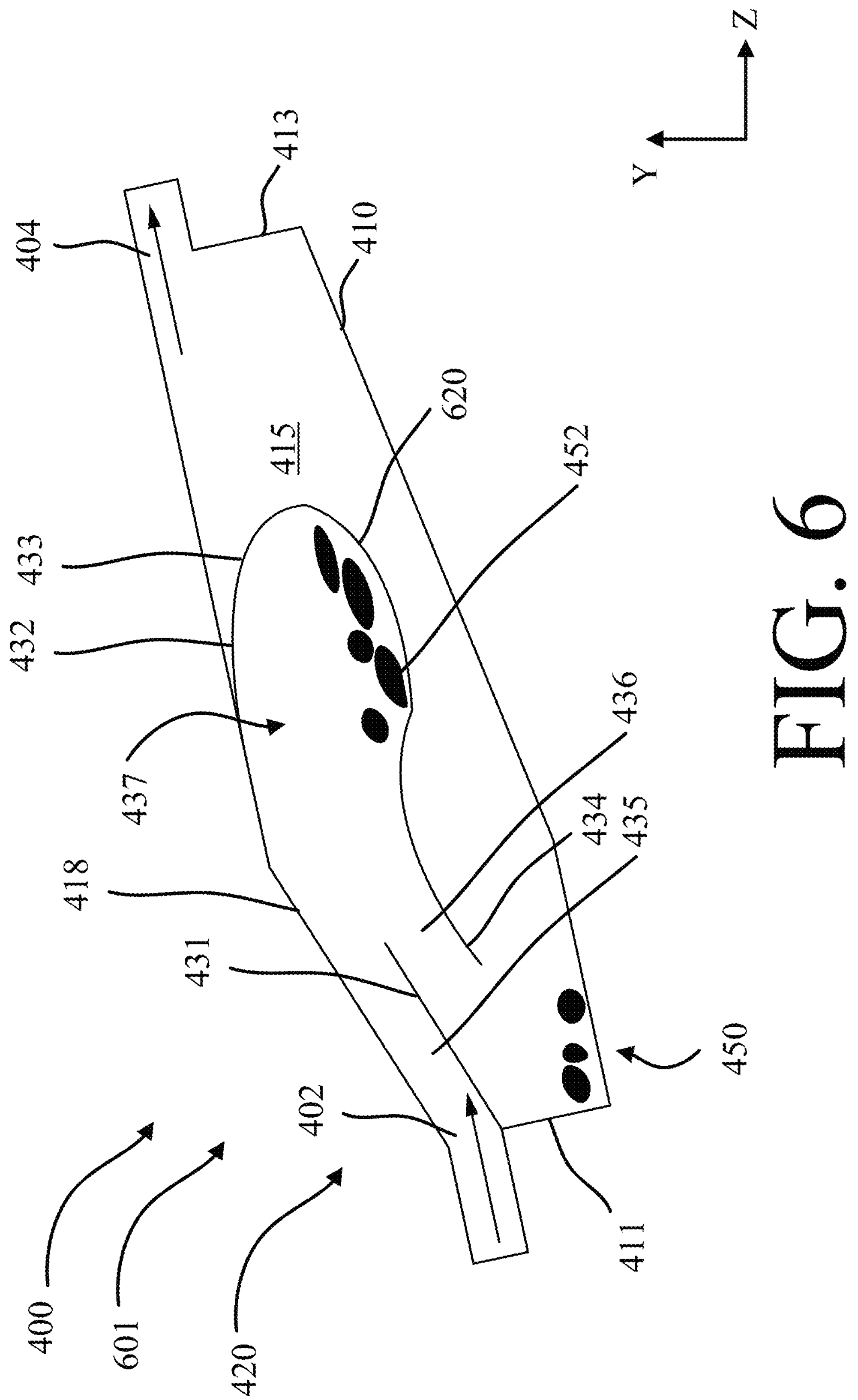
FIG. 6 illustrates a debris capture device for use in an exhaust system of a battery device, in accordance with various embodiments.

In various embodiments, as described further herein, the debris capture device 400 of the exhaust system comprises a baffle arrangement therein (e.g., single baffle configuration 401 from FIG. 4, multi baffle configuration 501 from FIG. 5, centrifugal baffle configuration 601 from FIG. 6, or any other baffle arrangement for collecting debris that is greater than 10 grams in weight or greater than 0.25 inches (0.635 cm) in any linear direction—i.e., within a spherical envelope). In various embodiments, the baffle arrangement can comprise a single baffle configuration (e.g., single baffle configuration 401 from FIG. 4), a multi baffle configuration (e.g., multi baffle configuration 501 from FIG. 5), or a centrifugal baffle configuration (e.g., centrifugal baffle configuration 601 from FIG. 6), as described further herein.

Referring back to FIG. 2B, in various embodiments, the electrically powered aircraft 100 includes a support structure 140 configured to secure the plurality of battery modules 210 to the aircraft body 130 from FIG. 2A. In various embodiments, the support structure 140 can comprise a rack for each array of battery modules (e.g., rack 142 for the first array of battery modules 213). In this regard, each battery module in the plurality of battery modules 210 of the battery system 200 is secured to the aircraft body 130 from FIG. 2B.

Figure 3:
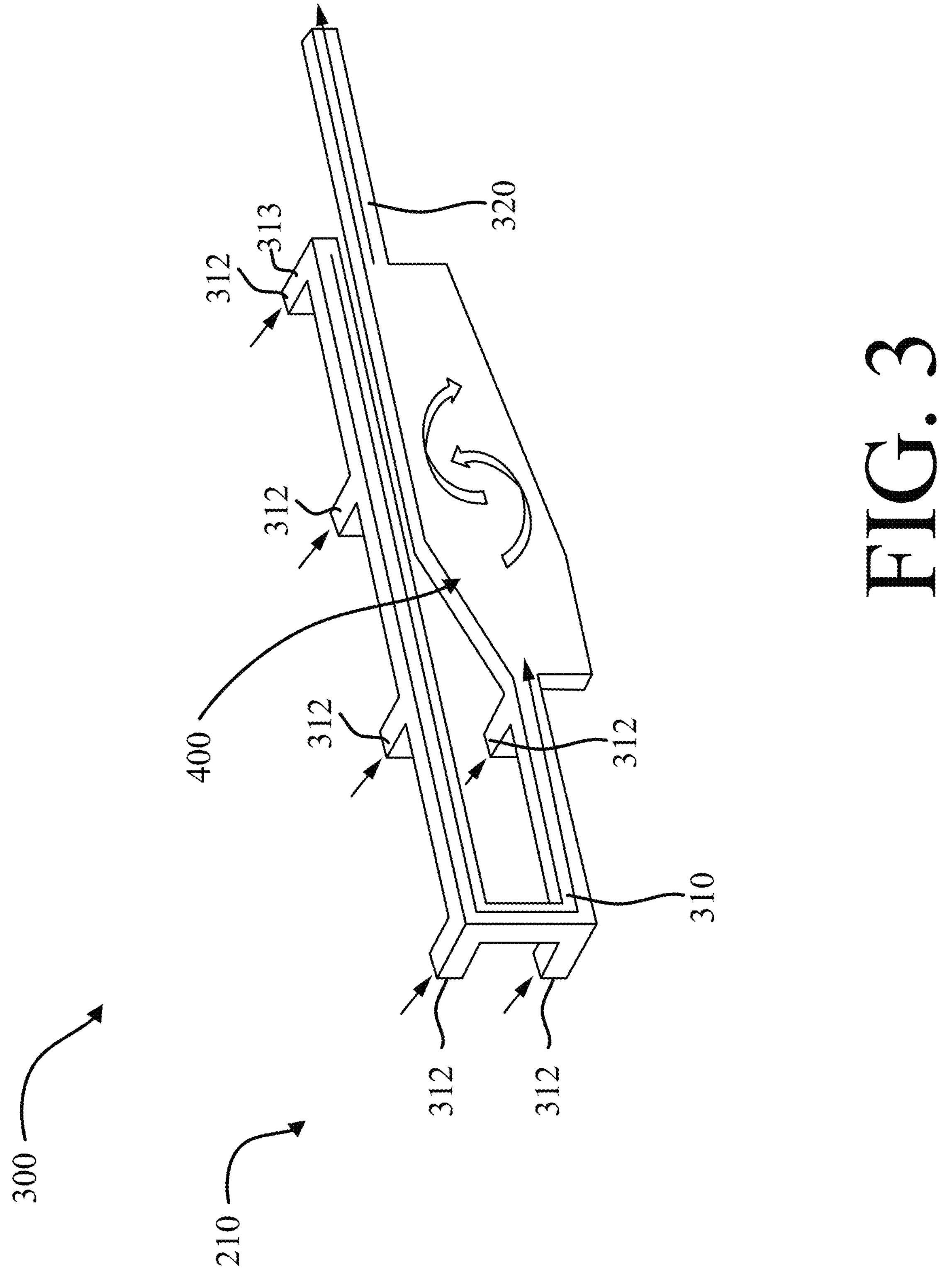
FIG. 3 illustrates a portion of an exhaust system having a debris capture device for a battery system, in accordance with various embodiments.

With reference now to FIG. 3, a portion of the exhaust system 300 with a debris capture device 400 is illustrated, in accordance with various embodiments. In various embodiments, the exhaust system 300 comprises the plumbing system 301 and the debris capture device 400. The plumbing system 301 comprises various fluid conduits (e.g., common inlet conduit 310, common outlet conduit 320, common exhaust conduits 223, 224, from FIG. 2B, etc.). Disposed between the common inlet conduit 310 and the common outlet conduit 320 is the debris capture device 400. The debris capture device 400 is configured to collect, trap, and/or prevent large debris (e.g., debris that is greater than a threshold size or a threshold weight) from being exhausted out the exhaust system 300 of the electrically powered aircraft 100.

In various embodiments, the plumbing system 301 comprises a plurality of inlet ports 312. In various embodiments, each inlet port in the plurality of inlet ports 312 is coupled to, and in fluid communication with, a respective common exhaust conduit for an array of battery (e.g., inlet port 313 can be fluidly coupled to the common exhaust conduit 223 of the first array of battery modules 213 from FIG. 2B).

In various embodiments, the debris capture device 400 is configured for exhaust from battery systems having the plurality of battery modules 210 from FIGS. 1, 2A, and 2B described previously herein. In various embodiments, the exhaust system 300 is configured to exhaust gases or the like at a flow rate between 0.001 to 5 kg/s. In various embodiments, the debris capture device 400 is configured to collect and/or trap debris that is larger than about 0.25 inches and/or about 10 grams. "About" as referred to herein means plus or minus 5%. In various embodiments, the debris capture device 400 is configured to collect and/or trap cell ejecta and debris components decoupled from inside the module.

In various embodiments, the debris capture device 400 is configured to prevent debris from exiting the common outlet conduit 320 of the plumbing system 301 of the exhaust system 300. In this regard, debris above a size threshold and/or a weight threshold can be prevented from falling from the electrically powered aircraft 100 from FIG. 1 during flight, in accordance with various embodiments.

In various embodiments, the debris capture device 400 can provide increased safety for on-ground bystanders from in-flight electrically powered aircrafts 100 from FIG. 1. In various embodiments, a possibility of increased certifiability can be created from the debris capture device 400. For example, if after a predetermined number of flight cycles (e.g., 2,000 flight cycles), a predetermined number of the electrically powered aircraft 100 (e.g., 1,000 aircrafts) all had negligible debris in the debris capture device 400, a statistical confidence level could be determined that the debris capture device 400 is not needed. In various embodiments, the debris capture device 400 can increase a diagnostic capability where otherwise that debris would be lost.

With combined reference to FIGS. 4, 5, and 6, a debris capture device 400 for a battery system (e.g., battery system 200 from FIGS. 1, 2A, and 2B) is illustrated in a single baffle configuration 401 (FIG. 4), a multi baffle configuration 501 (FIG. 5), and a centrifugal baffle configuration 601 (FIG. 6). Although illustrated with one of a single baffle configuration 401, a multi baffle configuration 501, and a centrifugal baffle configuration 601, the present disclosure is not limited in this regard. For example, any baffle arrangement configured to perturb debris that is above a threshold weight or a threshold size and facilitate collection of the debris within a debris capture device 400 is within the scope of this disclosure.

The debris capture device 400 comprises a housing 410 and a baffle arrangement 420. The housing 410 includes an inlet 402, an outlet 404, and a cavity 415 disposed therein. In various embodiments, the outlet 404 has a lesser cross-sectional area relative to the inlet 402. For example, the debris capture device 400 can reduce a head loss design criteria downstream of the debris capture device 400 (i.e., lesser cross-sectional area, sharper transitions, etc.). Accordingly, the outlet 404 can have a lesser cross-sectional area relative to the inlet 402 of the housing, and downstream components of the plumbing system 301 of the exhaust system 300 from FIGS. 1, 2A, 2B, and 3 can be smaller and lighter than upstream components of the plumbing system 301, in accordance with various embodiments.

In various embodiments, the housing 410 of the debris capture device 400 can comprise a metal (e.g., a pure metal or a metal alloy) having a melting temperature that is greater than 1.200° C. (2.192° F.). In this regard, the debris capture device 400 can be configured to maintain its structural integrity during a thermal runaway event of a cell in the battery system 200 from FIGS. 1, 2A, and 2B as described previously herein.

In various embodiments, the housing 410 of the debris capture device 400 is configured to be leak-proof during a thermal runaway event from the cell in the battery system (e.g., battery system 200 from FIGS. 1, 2A, and 2B). For example, the housing 410 can comprise a sheet metal box that is sealed along each edge (e.g., welded, brazed, or the like). Accordingly, adjacent components within the aircraft body 130 of the electrically powered aircraft 100 from FIGS. 1 and 2A can be protected during a thermal runway event, in accordance with various embodiments.

In various embodiments, in response to the gas carrying debris 452 that is above a threshold size and/or threshold weight into the cavity 415, the debris 452 is collected in the housing 410 (e.g., on a bottom side of the housing 410 in the single baffle configuration 401, the multi baffle configuration 501, and the centrifugal configuration or in a trap 620 of the centrifugal baffle configuration 601) in response to being perturbed by the baffle arrangement 420. In various embodiments, the housing 410 is configured to receive the gas carrying pieces of debris including the debris 452 through the inlet 402, retain the debris in the cavity 415, and expel the gas through the outlet 404.

The housing 410 includes a first sidewall 411 spaced apart longitudinally (i.e., in the Z-direction) from a second sidewall 413. The inlet 402 is disposed in the first sidewall 411, and the outlet 404 is disposed in the second sidewall 413.

Referring now to FIG. 4, a cross-sectional view of a debris capture device 400 in a single baffle configuration 401 during a thermal runaway event of a cell in the battery system 200 from FIGS. 1 and 2A-B is illustrated in accordance with various embodiments. The debris capture device 400 is configured to be in fluid communication with the common inlet conduit 310 and the common outlet conduit 320 of the plumbing system 301 of the exhaust system 300 from FIGS. 2A-C. In various embodiments, during operation of the electrically powered aircraft 100 from FIG. 1, the inlet 402 of the housing 410 is vertically (i.e., the Y-direction) below the outlet 404.

The baffle arrangement 420 in the single baffle configuration 401 includes a baffle 421 that extends from the second sidewall 413 into the cavity 415. In various embodiments, the outlet 404 can be partially defined by a top wall 418 of the housing and the baffle 421 of the baffle arrangement 420. In various embodiments, a length of the baffle 421 can be determined based on a minimum velocity of ejecta entering the cavity 415 from the inlet 402 and a threshold weight of the debris 452 that is desired to be captured. Stated another way, the baffle 421 can be configured to perturb any debris that is rising with gases of the ejecta towards the outlet 404 to prevent the debris from being exhausted out the outlet 404, in accordance with various embodiments. In various embodiments, the baffle 421 is spaced apart from the top wall (i.e., in a direction that is perpendicular to an inner surface of the top wall 418. In this regard a surface of the baffle 421 and the inner surface of the top wall 418 can be substantially parallel (i.e., parallel +/−10 degrees), in accordance with various embodiments.

In various embodiments, due to gravity and a velocity of gas coming through the inlet 402, debris 452 can be captured at a bottom of the cavity 415. In various embodiments, the debris 452 can fall upon entering the cavity 415, fall after contacting a vertical wall opposite the inlet 402 (e.g., second sidewall 413), fall after contacting the baffle 421, or the like. In various embodiments, larger debris can fall closer to the inlet 402, whereas smaller debris can travel with the gases further into the cavity 415 and fall after being perturbed (e.g., via the vertical wall opposite the inlet port 402, via the baffle 421, or the like), in accordance with various embodiments. Accordingly, the single baffle configuration 401 can be sized and configured to prevent debris that is greater than a threshold weight (e.g., 10 grams) and/or greater than a threshold size (e.g., greater than 0.25 inches (0.635 cm) in any linear direction) from exiting the outlet 404 of the housing 410, in accordance with various embodiments.

Referring now to FIG. 5, a cross-sectional view of a debris capture device 400 in a multi baffle configuration 501 during a thermal runaway event of a cell in the battery system 200 from FIGS. 1 and 2A-B is illustrated with like numerals depicting like elements, in accordance with various embodiments. In various embodiments, the multi baffle configuration 501 may be easier to build, easier to quantify, and/or easier to assess relative to the single baffle configuration 401 from FIG. 4 or the centrifugal baffle configuration 601 from FIG. 6. The debris capture device 400 is configured to be in fluid communication with the common inlet conduit 310 and the common outlet conduit 320 of the plumbing system 301 of the exhaust system 300 from FIGS. 1 and 2A-C. In various embodiments, the baffle arrangement 420 of the debris capture device 400 comprises a first baffle 422 and a second baffle 423. The first baffle 422 can extend downward (i.e., a generally negative Y-direction) from the top wall 418 of the housing 410. In various embodiments, the first baffle 422 is disposed proximal (i.e., closest relative to the other baffles) to the inlet 402 of the housing 410. In this regard, gases exiting the inlet 402 of the housing 410 can be forced in a downward direction around the first baffle 422, in accordance with various embodiments.

In various embodiments, the second baffle 423 is spaced apart (e.g., in a generally longitudinal direction—i.e., a positive Z-direction) from the first baffle 422. In various embodiments, the second baffle 423 extends upward (i.e., in a generally positive Y-direction) from a bottom wall 416 of the housing 410 of the debris capture device 400.

In various embodiments, a third baffle 424 is spaced apart (e.g., in a generally longitudinal direction—i.e., a positive Z-direction) from the second baffle 423. The third baffle 424 can extend downward (i.e., in a generally negative Y-direction) from the top wall 418 of the housing 410 of the debris capture device 400. In this regard, gases exiting the debris capture device 400 in the multi baffle configuration 501 can snake around the baffles 422, 423, 424 and exit the outlet 404 into the common outlet conduit 320 of the plumbing system 301 of the exhaust system 300. In various embodiments, debris 452 that is larger (or weighs more) in the pieces of debris 450 can be captured in a more forward location (i.e., negative Z-direction) in the housing 410 of the debris capture device 400 relative to smaller debris in the pieces of debris 450. In this regard, smaller debris can more easily be carried in exhaust gas; however, the exhaust gas is slowed by the baffles 422, 423, 424, causing the debris 452 in the pieces of debris 450 to fall once a low enough speed is reached, in accordance with various embodiments. Accordingly, the multi baffle configuration 501 can be sized and configured to prevent debris that is greater than a threshold weight (e.g., 10 grams) and/or greater than a threshold size (e.g., greater than 0.25 inches (0.635 cm) in any linear direction) from exiting the outlet 404 of the housing 410, in accordance with various embodiments.

Referring now to FIG. 6, a cross-sectional view of a debris capture device 400 in a centrifugal baffle configuration 601 during a thermal runaway event of a cell in the battery system 200 from FIGS. 1 and 2A-B is illustrated in accordance with various embodiments. The debris capture device 400 is configured to be in fluid communication with the common inlet conduit 310 and the common outlet conduit 320 of the plumbing system 301 of the exhaust system 300 from FIGS. 1 and 2A-C. In various embodiments, in the centrifugal configuration, the baffle arrangement 420 of the debris capture device 400 comprises a first baffle 431 and a second baffle 432. The first baffle 431 can extend upward and longitudinally (i.e., at a slope in the positive Y-Z direction) from the first sidewall 411 disposed at a forward end of the debris capture device 400. In various embodiments, the first baffle 431 and the top wall 418 define an inlet conduit 435 that outputs fluid flow toward the second baffle 432. In various embodiments, the centrifugal baffle configuration 601 may be more efficient relative to the single baffle configuration 401 from FIG. 4 or the multi baffle configuration 501 from FIG. 5. However, the centrifugal configuration may be more complicated and/or be more expensive to manufacture relative to the multi baffle configuration 501 from FIG. 5 or the single baffle configuration 401 from FIG. 4.

In various embodiments, the second baffle 432 comprises a curved 433 portion and a straight portion 434. In various embodiments, the curved portion 433 extends from the top wall 418 of the housing 410 downward and toward the second sidewall 413, around, and back toward the first sidewall 411. In this regard, in response to gas being output from the inlet conduit 435 towards the second baffle 432, the fluid may travel along the curved portion of the second baffle 432. In various embodiments, the debris capture device 400 further comprises an inlet conduit 435 and an outlet conduit 436 of a debris capture region 437. The debris capture region 437 may be defined by the centrifugal baffle configuration 601 of the baffle arrangement 420. In various embodiments, the inlet conduit 435 can be defined in a first direction, and the outlet conduit 436 can be defined in a second direction, and the second direction can be substantially opposite (i.e., between 165 degrees and 195 degrees), in accordance with various embodiments. In various embodiments, the inlet conduit can be defined between the top wall 418 and the first baffle 431, and the outlet conduit 436 can be defined between the first baffle 431 and the straight portion 434 of the second baffle 432. In various embodiments, the baffle arrangement 420 in the centrifugal baffle configuration 601 is configured to capture the debris 452 in the pieces of debris 450 via a centrifugal effect.

In response to the centripetal force on the pieces of debris 450 traveling along the curved path, debris 452 in the pieces of debris 450 may be ejected from the gas and trapped along the bottom of the housing 410 or trapped along the second baffle 432 (e.g., in a trap 620 of the second baffle 432) as shown. In various embodiments, larger debris may be captured along the curved portion of the second baffle 432 (i.e., in the trap 620 of the second baffle 432) and smaller debris may be captured proximate an output from the second baffle 432 defined between the second baffle 432 and the first baffle 431. In various embodiments the trap 620 is configured to trap debris 452 in the pieces of debris 450.

In various embodiments, after exiting the output defined between the first baffle 431 and the second baffle 432 the gas may travel vertically and laterally aft to the common outlet conduit 320. Accordingly, the centrifugal baffle configuration 601 can be sized and configured to prevent debris that is greater than a threshold weight (e.g., 10 grams) and/or greater than a threshold size (e.g., greater than 0.25 inches (0.635 cm) in any linear direction) from exiting the outlet 404 of the housing 410, in accordance with various embodiments.

In various embodiments, the debris capture device 400 can account for various inputs. For example, thermal runaway characterization, module design, and/or system design. In various embodiments, thermal runaway characterization can include energy produced, mass flowrate, ejecta size, gas composition, or the like. In various embodiments, module design can account for propagation characterization, propagation speed, and/or module debris characterization. In various embodiments, the system design can account for dead loss consideration, multi-module thermal runaway allowance; space claim geometry allowance, exhaust debris allowance, and/or maintenance requirements.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A debris capture device for a battery system, the debris capture device comprising:

a housing including an inlet, an outlet, and a cavity disposed therein; and a baffle arrangement disposed within the cavity of the housing, wherein in response to a cell in the battery system entering thermal runaway, the housing is configured to receive an ejecta from the cell and the baffle arrangement is configured to collect a debris that has a weight that is greater than 10 grams and eject a gas from the ejecta through the outlet, wherein:

the housing includes a first sidewall spaced apart in a longitudinal direction from a second sidewall, the inlet disposed in the first sidewall, the inlet including a first center point that is a first vertical height from a bottom side of the housing, the outlet disposed in the second sidewall, the outlet including a center point that is a second vertical height from the bottom side of the housing, the baffle arrangement includes a first baffle spaced apart in the longitudinal direction from the first sidewall, the baffle arrangement includes a second baffle spaced apart in the longitudinal direction from the first baffle, the baffle arrangement includes a third baffle spaced apart in the longitudinal direction from the second baffle, the first baffle extends in a first downward direction from a top wall of the housing, the second baffle extends in an upward direction from a bottom wall of the housing, the third baffle extends in a second downward direction from the top wall, and the second vertical height is greater than the first vertical height.

2. The debris capture device of claim 1, wherein the outlet has a lesser cross-sectional area relative to the inlet, and wherein the housing comprises a metal having a melting temperature that is greater than 1,200° C. (2,192° F.).

3. The debris capture device of claim 1, wherein the housing is configured to be leak-proof during a thermal runaway event from the cell in the battery system entering thermal runaway.

4. The debris capture device of claim 1, wherein in response to the gas carrying the debris into the cavity, the debris is collected in the housing in response to being perturbed by the baffle arrangement.

5. The debris capture device of claim 4, wherein the housing is configured to receive the gas carrying the debris through the inlet, retain the debris in the cavity, and expel the gas through the outlet.

6. The debris capture device of claim 1, wherein the baffle arrangement includes one of a single baffle configuration, a multi baffle configuration, or a centrifugal baffle configuration.

7. The debris capture device of claim 1, wherein the inlet is in fluid communication with a common inlet conduit, the common inlet conduit in fluid communication with a plurality of cells.

* * * * *